US009742270B2

(12) United States Patent
Petenyi

(10) Patent No.: US 9,742,270 B2
(45) Date of Patent: Aug. 22, 2017

(54) VOLTAGE REGULATOR CIRCUITS, SYSTEMS AND METHODS FOR HAVING IMPROVED SUPPLY TO VOLTAGE REJECTION (SVR)

(71) Applicant: STMicroelectronics Design and Application S.R.O., Prague (CZ)

(72) Inventor: Sandor Petenyi, Milovice Nad Labem (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 0 days.

(21) Appl. No.: 14/986,425

(22) Filed: Dec. 31, 2015

(65) Prior Publication Data

US 2017/0194855 A1 Jul. 6, 2017

(51) Int. Cl.
*H02M 3/156* (2006.01)
*H02M 1/44* (2007.01)
*G05F 1/625* (2006.01)

(52) U.S. Cl.
CPC ............ *H02M 3/156* (2013.01); *G05F 1/625* (2013.01); *H02M 1/44* (2013.01)

(58) Field of Classification Search
CPC .......... H02M 1/12; H02M 1/14; H02M 1/143; H02M 1/15; H02M 2001/12; H02M 1/44; H02M 1/158; G05F 1/467; G05F 3/242; G05F 1/625
See application file for complete search history.

(56) References Cited

U.S. PATENT DOCUMENTS 6,157,180 A * 12/2000 Kuo ........................ G05F 3/242 323/282
6,603,293 B2 * 8/2003 Knoedgen ............... G05F 1/467 323/280
2004/0017698 A1 * 1/2004 Huber .................. G11C 7/1069 365/189.11
2007/0029981 A1 * 2/2007 Johnson ................ H02M 3/158 323/222

* cited by examiner

*Primary Examiner* — Matthew Nguyen
(74) *Attorney, Agent, or Firm* — Seed IP Law Group LLP

(57) ABSTRACT

A voltage regulator is controlled to improve supply voltage rejection by cancelling an alternating component of a supply voltage signal that is capacitively coupled to a high-impedance node within the voltage regulator. This cancellation is done by capacitively coupling an inverted version of the alternating component to the high-impedance node to thereby substantially cancel the alternating component present on the high-impedance node. The high-impedance node may be a high-impedance voltage reference node of the voltage regulator.

15 Claims, 5 Drawing Sheets

VOLTAGE REGULATOR CIRCUITS, SYSTEMS AND METHODS FOR HAVING IMPROVED SUPPLY TO VOLTAGE REJECTION (SVR)

BACKGROUND

Technical Field

The present disclosure relates generally to voltage regulators, and more specifically to supply voltage rejection (SVR) in voltage regulators.

Description of the Related Art

Supply voltage rejection (SVR) is one of the most important parameters utilized to characterize the performance of a voltage regulator. A voltage regulator receives an input or supply voltage and generates a controlled or regulated output voltage having an approximately constant value independent of variations in the supply voltage. Variations in the value of the supply voltage may be present because of an alternating component or noise signal present on the supply voltage. This noise signal or simply "noise" may be caused by a variety of factors, such as switching of components in electronic circuitry coupled to or positioned proximate the regulator. The SVR of the voltage regulator indicates the ability of the voltage regulator to suppress this noise such that these variations are not present on the output voltage of the regulator. SVR is typically measured in decibels on a logarithmic scale utilizing the ratio of the variations in the output voltage divided by variations in the input voltage.

As will be appreciated by those skilled in the art, the SVR of a voltage regulator is a frequency dependent parameter having characteristics determined by the type of circuitry utilized in forming the voltage regulator as well as the physical layout of this circuitry. The SVR typically worsens as frequency increases and is influenced by parasitic components in the voltage regulator, which are present in all electronic circuits. This is true because as the frequency of the noise on the input increases, more of this noise is coupled to the output of the regulator through these parasitic components, degrading the SVR of the regulator.

Where the voltage regulator is formed in an integrated circuit, the distances between components forming the regulator may be extremely small, resulting in parasitic elements, particularly capacitive parasitic elements, having significant values that may adversely affect the SVR of the voltage regulator. For example, conductive layers separated by extremely thin interlayer dielectrics may result in parasitic capacitances in the femtofarad range. While femtofarad parasitic capacitances have extremely small values in absolute terms, the reactance values and resulting capacitive coupling introduced by such parasitic capacitances can be significant in the frequency operating ranges of modern integrated circuits, particularly in the Megahertz and Gigahertz frequency ranges. This unwanted capacitive coupling lowers the SVR of the voltage regulator, which is of course undesirable. As the frequency of operation increases, the capacitive coupling of these parasitic capacitances increases, as will be appreciated by those skilled in the art.

No matter how the circuitry of a voltage regulator is physically arranged in the integrated circuit or the particular materials used for forming such circuitry, parasitic capacitances and the associated undesirable parasitic coupling effects cannot be completely avoided or eliminated. Typically, layout modifications are made and shielding used to reduce the adverse effects of parasitic capacitances on the SVR of a voltage regulator. There is a need for improved approaches to achieve desired levels of SVR where such layout modifications and shielding do not yield the desired performance.

BRIEF SUMMARY

According to one embodiment of the present disclosure, a method of controlling a voltage regulator to improve supply voltage rejection includes cancelling a noise or alternating component of a supply voltage signal that is capacitively coupled to a high-impedance node in the voltage regulator. This cancellation is done by capacitively coupling an inverted version of the alternating component to the high-impedance node to thereby substantially cancel the alternating component present on the node. The high-impedance node may be a high-impedance voltage reference node of the voltage regulator.

DETAILED DESCRIPTION

Figure 1:
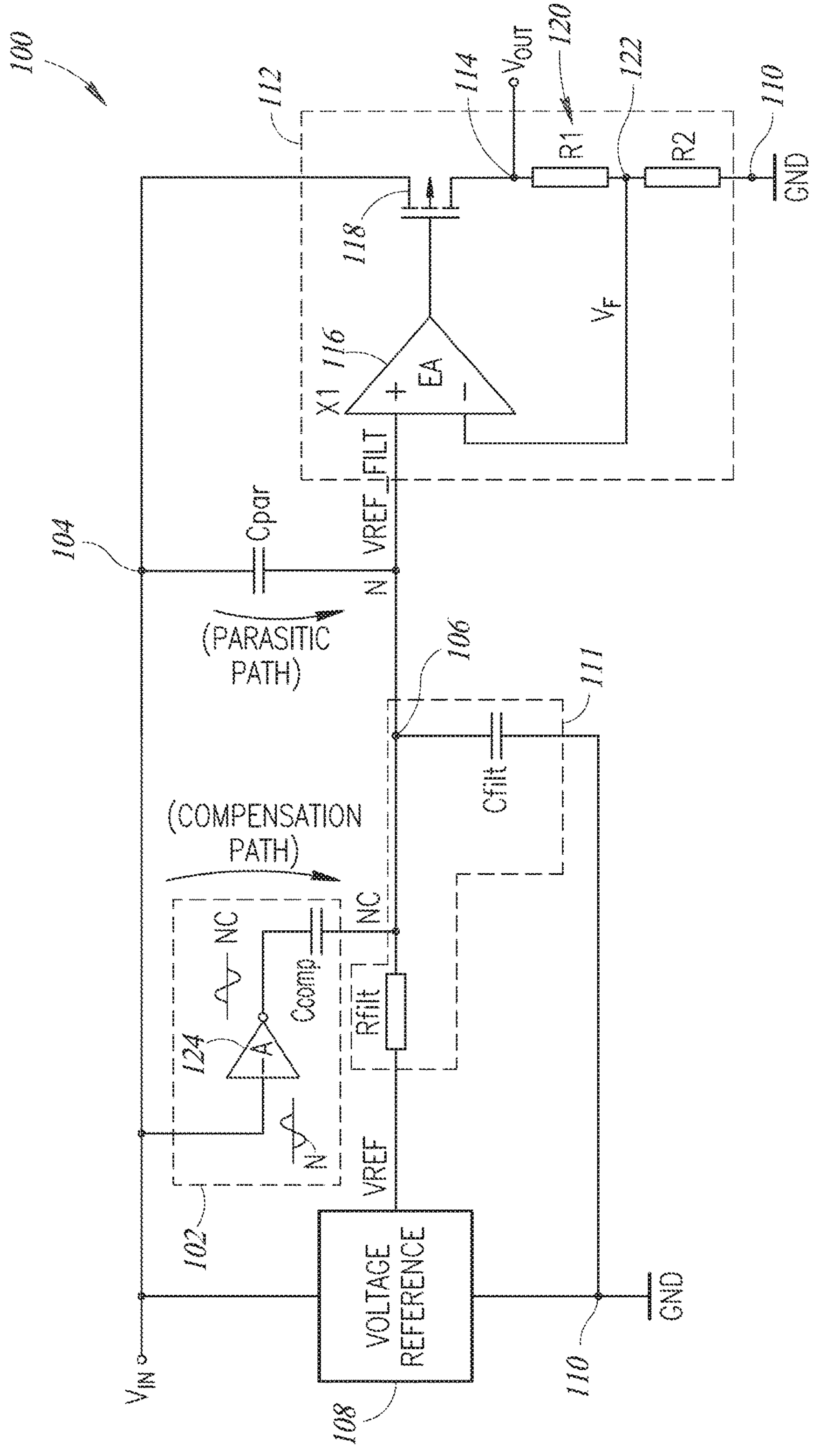
FIG. 1 is a schematic of a voltage regulator including a noise compensation circuit according to one embodiment of the present disclosure.

FIG. 1 is a schematic of a voltage regulator 100 including a noise compensation circuit 102 that improves the supply voltage rejection (SVR) of the voltage regulator according to one embodiment of the present disclosure. In the voltage regulator 100 and in voltage regulators generally, the most significant parasitic capacitive couplings are those between the input or supply voltage line and high impedance nodes in the regulator. In the embodiment of FIG. 1, the supply voltage line is designated as an input or supply voltage node 104 and the noise compensation circuit 102 is coupled between this supply voltage node and a high impedance reference voltage node 106 in the regulator 100. In operation, the noise compensation circuit 102 generates a noise cancellation signal NC on the reference voltage node 106 that cancels or at least reduces a noise signal N present on the high impedance reference voltage node 106 due to parasitic capacitive coupling between the reference voltage node and the supply voltage node 104, as will be described in more detail below. Noise on the nodes 104 and 106 may also be referred to as a "noise signal" on these nodes in the present description.

The voltage regulator 100 includes a voltage reference circuit 108 that is coupled between the supply voltage node 104 and a reference node 110 that is coupled to ground GND in the embodiment of FIG. 1. The voltage reference circuit 108 generates a reference voltage VREF from the supply voltage VIN having an approximately constant value independent of the value of the supply voltage, provided the supply voltage is within a specified operating range. The reference voltage VREF is provided through a low pass RC filter 111 to provide a filtered reference voltage VREF_FILT on the high impedance reference voltage node 106. The RC filter 111 filters high frequency noise that may be present on the VREF voltage from the voltage reference circuit 108 and includes a resistor RFILT coupled between the output of the voltage reference circuit 108 and the reference voltage node 106. A filter capacitor CFILT of the RC filter 111 is coupled between the reference voltage node and the reference node 110 coupled to ground GND.

The voltage regulator 100 further includes an output circuit 112 operable to generate an output voltage VOUT on an output node 114 in response to the filtered reference voltage VREF_FILT on the high impedance reference voltage node 106. In the embodiment of FIG. 1, the output circuit includes an error amplifier 116 that is an operational amplifier in the embodiment of FIG. 1. The error amplifier 116 drives a PMOS transistor 118 having it source coupled to the supply voltage node 104 and drain coupled to the output node 114. A voltage divider 120 including resistors R1 and R2 is coupled in series with the PMOS transistor 118 between the output node 114 and the reference node 110 coupled to ground GND. A feedback node 122 defined at the interconnection of the resistors R1 and R2 provides a feedback voltage VF to the inverting input of the error amplifier 116. In operation, the error amplifier 116 drives the PMOS transistor 118 so that the feedback voltage VF on the node 122 is equal to the filtered reference voltage VREF_FILT on the high impedance reference voltage node 106. The values of the resistors R1 and R2 are chosen so that when the feedback voltage VF is equal to the filtered reference voltage VREF_FILT the output voltage VOUT has the desired value.

Before describing the more detailed operation of the noise compensation circuit 102, the characteristics of the reference voltage node 106 will first be discussed in more detail. Filtering of the reference voltage node in voltage regulators through an RC filter is typically done in conventional voltage regulators. This RC filtering reduces high frequency noise on the reference voltage node, improves SVR performance of the voltage regulator, and provides soft-startup waveform definition, as will be appreciated by those skilled in the art. The RC filter 111 also provides all these functions for the voltage regulator 100. The reference voltage signal VREF from the voltage reference circuit 108 is filtered by RC filter 111 to provide the filtered reference voltage signal VREF_FILT. The cutoff frequency of RC filter 111 should be low enough to remove the largest possible portion of the noise spectrum of the VREF signal from the voltage reference circuit 108, as well as to remove possible high frequency signals coupled to reference voltage node 106 from the supply voltage VIN on the supply voltage node 104.

For the RC filter 111 to provide a low cutoff frequency, the values of the resistor RFILT and capacitor CFILT forming the filter must have sufficiently large values. Because the values of capacitances that can be formed in a typical integrated circuit, the maximum value of the capacitor CFILT is limited to approximately 100-200 picofarads (pF) typically. As a result, to achieve the desired low cutoff frequency of the RC filter 111 the value of the resistor RFILT must be quite large, typically in the range of 10 MΩ to 100 MΩ. This very large value for the resistor RFILT makes the reference voltage node 106 a very high impedance node. Such high impedance on the reference voltage node 106 makes this node susceptible to noise since any noise coupled to the node does not have any low impedance path to follow to be removed from the node. This will result in a relatively large noise signal on the reference voltage node being superimposed on the filtered reference voltage signal VREF_FILT.

Noise can be coupled to the reference voltage node 106 in different ways, but the most dominant way is capacitive coupling between the supply voltage node 104 that receives the supply voltage VIN and the reference voltage node. This capacitive coupling is depicted on FIG. 1 as the parasitic capacitance CPAR coupled between the node 104 and the reference voltage node 106. The coupling of noise present on the supply voltage node 104 to the reference voltage node 106 may adversely affect SVR performance of the voltage regulator 100 because any noise present on the reference voltage node 106 may be amplified by the error amplifier 116 and provided on the output node 114 superimposed on the output voltage VOUT. Ideally, the coupling of noise from the node 104 to the high impedance reference node 106 would be minimized for good SVR performance of the regulator 100. As previously described, however, the value of the parasitic capacitance CPAR is difficult to reduce to a small enough value to avoid a negative impact on the SVR of the regulator 100.

Instead of trying to minimize the value of parasitic capacitance CPAR and thereby the coupling between the nodes 104 and 106, the noise compensation circuit 102 generates the noise cancellation signal NC on the reference voltage node 106 to reduce or cancel the noise signal N present on the high impedance reference voltage node 106 due to the parasitic capacitance CPAR between the reference voltage node and the supply voltage node 104. To cancel the noise signal N generated on the node 106 due to the parasitic capacitance CPAR, the noise compensation circuit 102 generates the noise cancellation signal NC that is inverted or has a 180 degree phase shift relative to the noise signal N. Accordingly, in the embodiment of FIG. 1 the noise compensation circuit 102 includes an inverting buffer 124 that inverts the noise signal N present on the node 104 to generate the noise compensation signal NC which, in turn, is supplied through a compensation capacitor CCOMP to the reference voltage node 106. The buffer 124 has a gain −A and for cancellation of the noise signal N the value of the compensation capacitor CCOMP is chosen such that $C_{COMP}=1/AC_{PAR}$, where A is the magnitude of the gain of the inverting buffer 124.

The compensation circuit 102 in this way generates a signal through a compensation path that is equal in magnitude but 180 degrees shifted in phase (i.e., inverted) relative to the noise signal N that is coupled through a parasitic path. The compensation and parasitic paths are indicated with arrows in FIG. 1. The inverting buffer 124 of the compensation circuit 102 has a wide bandwidth for effective cancellation of the noise signal N. This is true because the only those parts of the frequency spectrum of the noise signal N that are amplified and phase shifted by the inverting buffer 124 will be cancelled. The bandwidth of the inverting buffer 124 is thus ideally at least as wide as and overlapping the frequency spectrum of the noise signal N.

Figure 2:
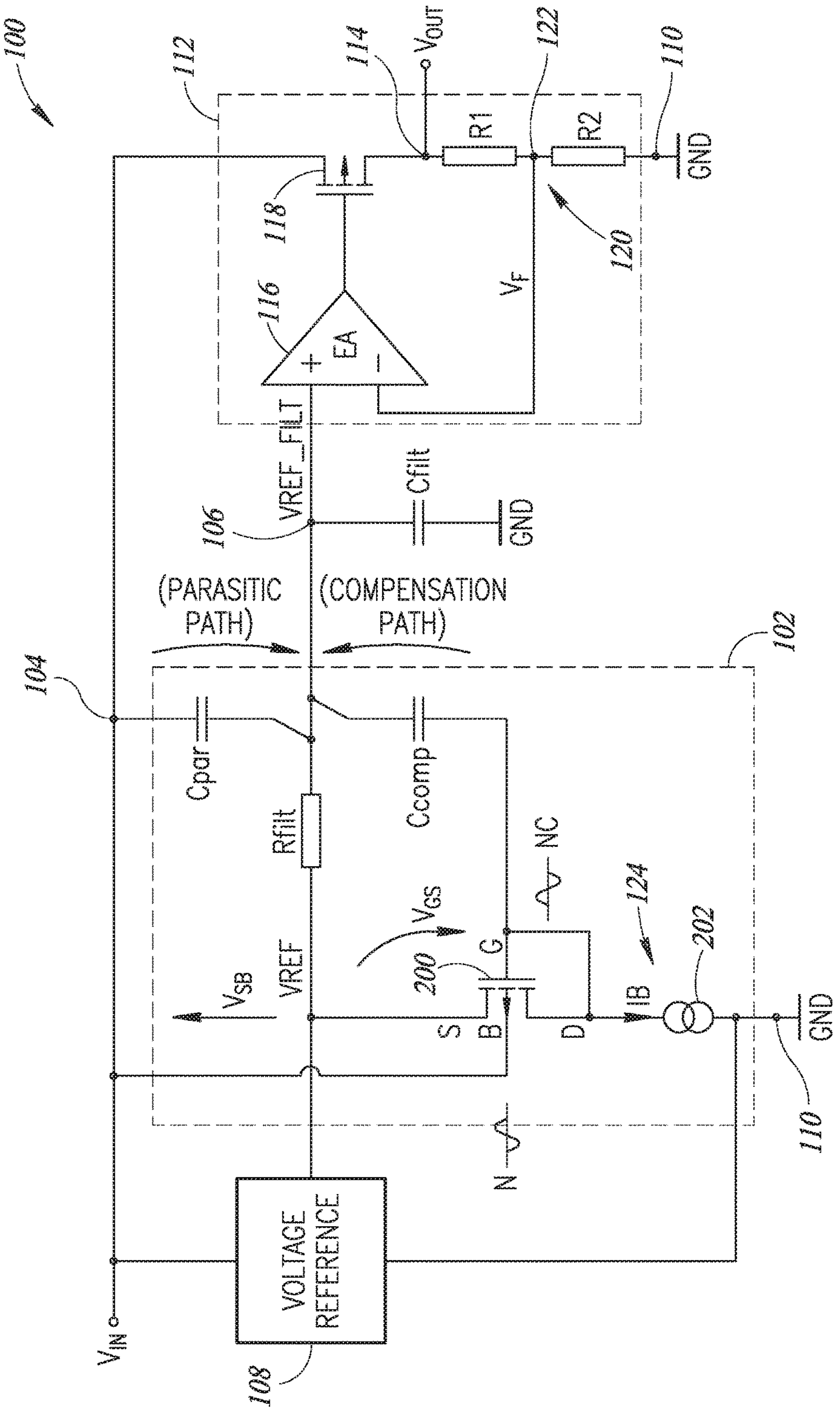
FIG. 2 is a schematic showing in more detail the structure of the noise compensation circuit of FIG. 1 according to one embodiment of the present disclosure.

FIG. 2 is a schematic showing in more detail the structure of the noise compensation circuit 102 of FIG. 1 according to one embodiment of the present disclosure. Components that are the same as those in FIG. 1 have been given the same reference designations and will not again be described in detail. FIG. 2 illustrates one embodiment of the inverting buffer 124 in the compensation circuit 102. In the embodiment of FIG. 2, the inverting buffer 124 is formed by a PMOS transistor 200 having its drain D and source S coupled in series with a current source 202 between the voltage reference node 106 and ground node 110. The PMOS transistor 200 is coupled as a diode-coupled transistor with its drain D coupled to its gate G. In addition, the body or bulk B of the PMOS transistor 200 is coupled to the supply voltage node 104 and is utilized in achieving the desired signal inversion of the noise signal N to generate the noise compensation signal, as will be described in more detail below.

This embodiment of the inverting buffer 124 is a simple circuit including only the PMOS transistor 200 and current source 202 for biasing the PMOS transistor at a DC drain-to-source current IB. This simplicity of the buffer 124 reduces the required silicon area occupied by the circuit and also the current consumption of the circuit. In operation, the bias current IB defines the gate-to-source voltage $V_{GS}$ of the PMOS transistor 200. This gate-to-source voltage $V_{GS}$ is also, however, a function of the source-to-bulk voltage VSB of the transistor. This source-to-bulk voltage VSB depends on the noise signal N present on the supply voltage node 104 since the source is maintained at the constant reference voltage VREF provided by the voltage reference circuit 108. When the source-to-bulk voltage VSB is increasing (i.e., voltage on supply voltage node 104 is increasing), the gate-to-source voltage VGS of the transistor 200 is increasing as well. Because the source S of the transistor 200 is held at the fixed reference voltage VREF, the fact that the gate-to-source voltage VGS voltage is increasing means that the voltages of the gate G and drain D, which are coupled together, must be decreasing. This must be true for the gate-to-source voltage VGS voltage to be increasing. As a result, the polarity and thus the phases of the voltages on the gate G and drain D are the opposite relative to the voltage on the bulk B, which is the voltage on the supply voltage node 104. Thus, as seen in FIG. 2, the noise signal N present on the supply voltage node 104 and thereby the bulk B of the transistor 200 results in the transistor generating an inverted or 180 degree phase shifted version of this signal in the form of the noise cancellation signal NC on the gate G of the transistor. This NC signal is again applied through the compensation capacitor CCOMP to the reference voltage node 106 to cancel the noise signal N coupled to that node through the parasitic capacitor CPAR, as discussed above with reference to FIG. 1.

As just described, the gate G and drain D voltages have the opposite polarity (i.e., are inverted) with respect to noise signal N present on supply voltage VIN on the node 104. The relationship between the source-to-bulk voltage $V_{SB}$ and the gate-to-source voltage $V_{GS}$ of the transistor 200 is given by following formula:

$$\Delta V_T = V_{T0} + \gamma\left(\sqrt{\Delta V_{SB} + 2\cdot\varphi_B} - \sqrt{2\cdot\varphi_B}\right) \qquad \text{Eqn. 1}$$

where $\Delta V_T$ is the change in threshold voltage $V_T$ of the PMOS transistor 200, $V_{TO}$ is the threshold voltage of this transistor when the source-to-body voltage $V_{SB}$=0, γ is the body effect parameter of the transistor, and $\phi_B$ is the potential drop between the surface and bulk across the depletion layer of the transistor when $V_{SB}$=0 and the voltage on the gate is sufficient to ensure that a channel is present in the transistor. These parameters and Eqn. 1 generally will be understood by those skilled in the art.

From Eqn. 1 it is seen that the relationship between the source-to-body voltage $V_{SB}$ and the gate-to-source voltage $V_{GS}$ (i.e., the threshold voltage $V_T$ in Eqn. 1) is nonlinear since the $V_{SB}$ term is under the square root sign in Eqn. 1. Moreover the product of the square root function is scaled by the body effect parameter (γ). This means that the transfer characteristics or gain of the inverting buffer 124 including the PMOS transistor 200 will be different from unity in most cases. This is compensated for in the embodiment of the inverting buffer 124 of FIG. 2 by adjusting the value of the compensation capacitor CCOMP. For complete compensation, meaning the noise cancellation signal NC has an amplitude and phase sufficient to completely cancel the noise signal N coupled to the voltage reference node 106, the value of the compensation capacitor CCOMP once again equals $$C_{COMP} = \frac{1}{A} C_{PAR}$$

where A is now the $$\text{ratio} = \frac{\Delta V_T}{\Delta V_{SB}}.$$

The DC voltage present on the drain D and gate G of the PMOS transistor 200 does not affect the operation of the transistor because the gate and drain are coupled isolated for DC signals from the reference voltage node 106 by the compensation capacitor CCOMP. Instead, the transfer characteristics of the PMOS transistor 200 are of significance since these transfer characteristics need to handle signals in the specified range of frequencies over which the SVR of the regulator 100 is to be improved. The SVR is a frequency-dependent parameter as mentioned above, and thus the transfer characteristics of the PMOS transistor 200 must operate on signals in the frequency range that the SVR is to be improved.

Figure 3:
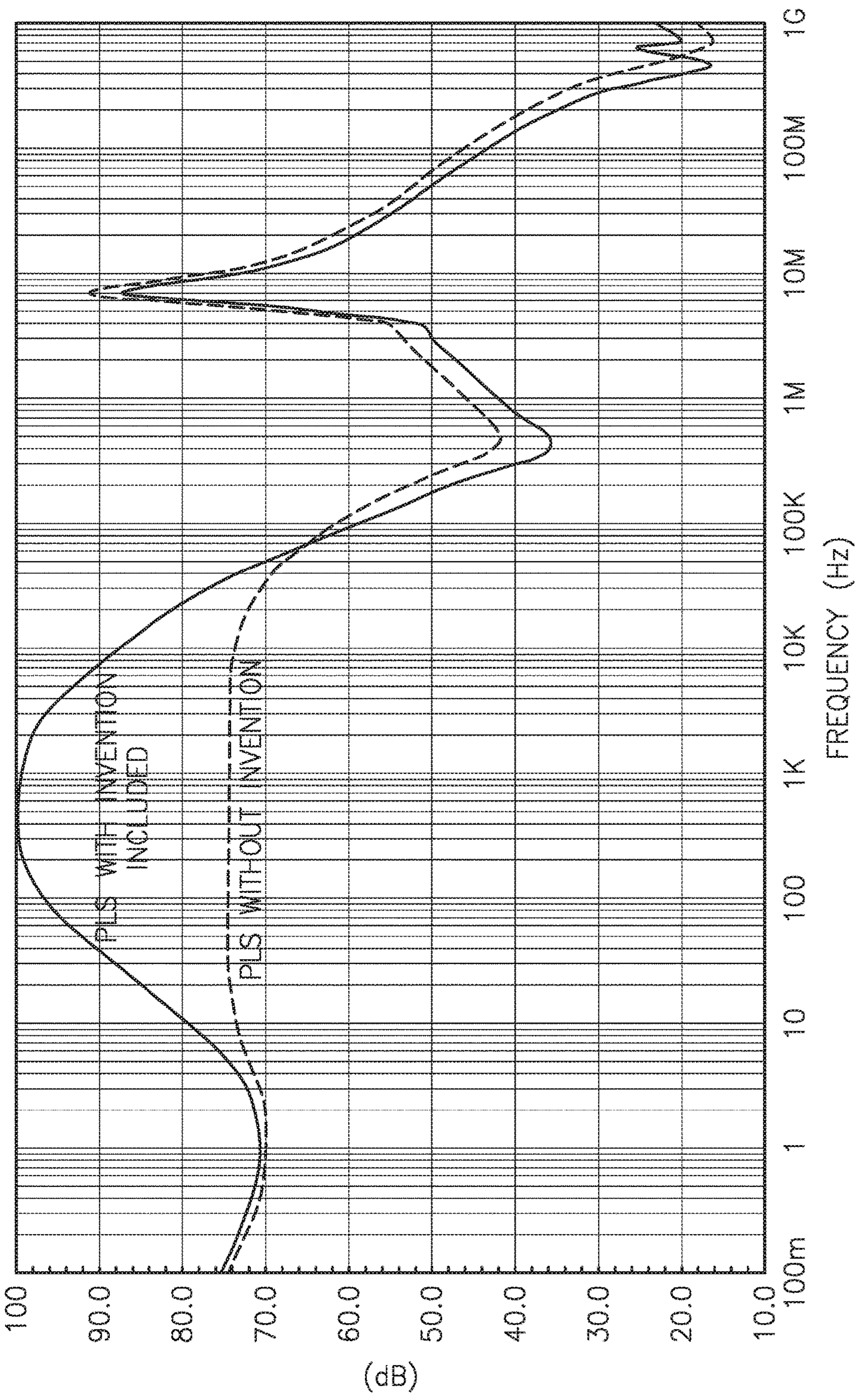
FIG. 3 is graph showing supply voltage rejection (SVR) as function of frequency for a post-layout simulation (PLS) of the voltage regulator of FIG. 2 including the noise compensation circuit and a post-layout simulation of the same voltage regulator without the compensation circuit.

FIG. 3 is graph showing in the solid line the supply voltage rejection (SVR) as function of frequency for a post-layout simulation of the voltage regulator 100 of FIG. 2 including the noise compensation circuit 102. FIG. 3 also shows through the dashed line a post-layout simulation of the SVR of the regulator 100 of FIG. 1 or 2 with the compensation circuit 102 omitted. A post-layout simulation is a computer simulation of the operation of a circuit after a computer-generated physical layout for the circuit has been generated, as will be appreciated by those skilled in the art. The graph of FIG. 3 shows the SVR in decibels dB on the vertical axis and frequency along the horizontal axis. The frequency range of interest in the example in FIG. 3 is assumed to be from approximately 10 Hz to 10 kHz. As see in the graph, the SVR of the regulator 100 with the compensation circuit 102 of FIG. 2 (solid line) is much higher, reaching a peak of approximately 100 dB, over this frequency range than the SVR of the regulator without the compensation circuit (dashed line) over this same frequency range.

Figure 4:
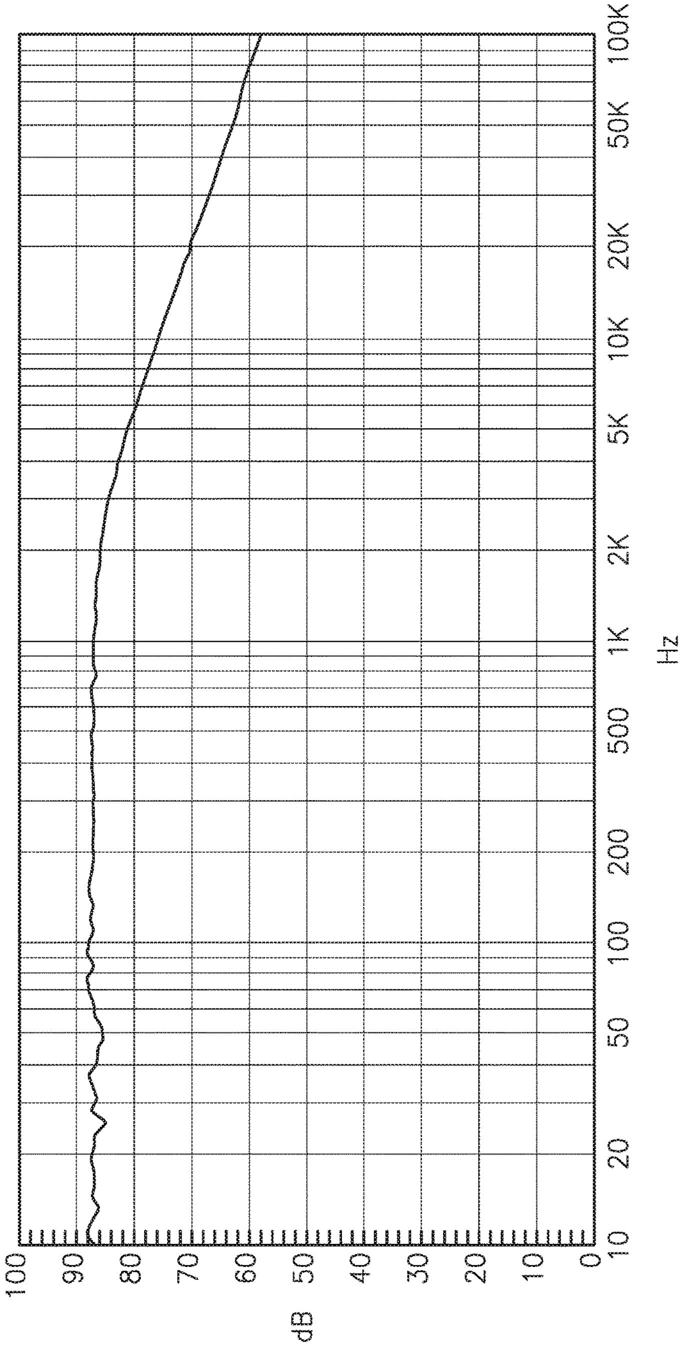
FIG. 4 is a graph showing SVR as a function of frequency for a real integrated circuit embodiment of the voltage regulator of FIG. 2.

FIG. 4 is a graph again showing SVR a function of frequency for an actual integrated circuit embodiment of the voltage regulator 100 of FIG. 2. The vertical axis of the graph again shows the SVR in decibels dB while frequency is again shown along the horizontal axis. Up until about 1 kHz the SVR is very high as just below +90 dB and at about 1 kHz the SVR starts decreasing in magnitude. The more positive the SVR the better and as seen in FIG. 4 even at 10 kHz the SVR is still almost +80 dB. FIG. 4 illustrates the a real embodiment of the voltage regulator 100 of FIG. 2 actually formed in a semiconductor chip provides a good SVR over the frequency range of interest, namely 10 Hz-10 kHz.

Figure 5:
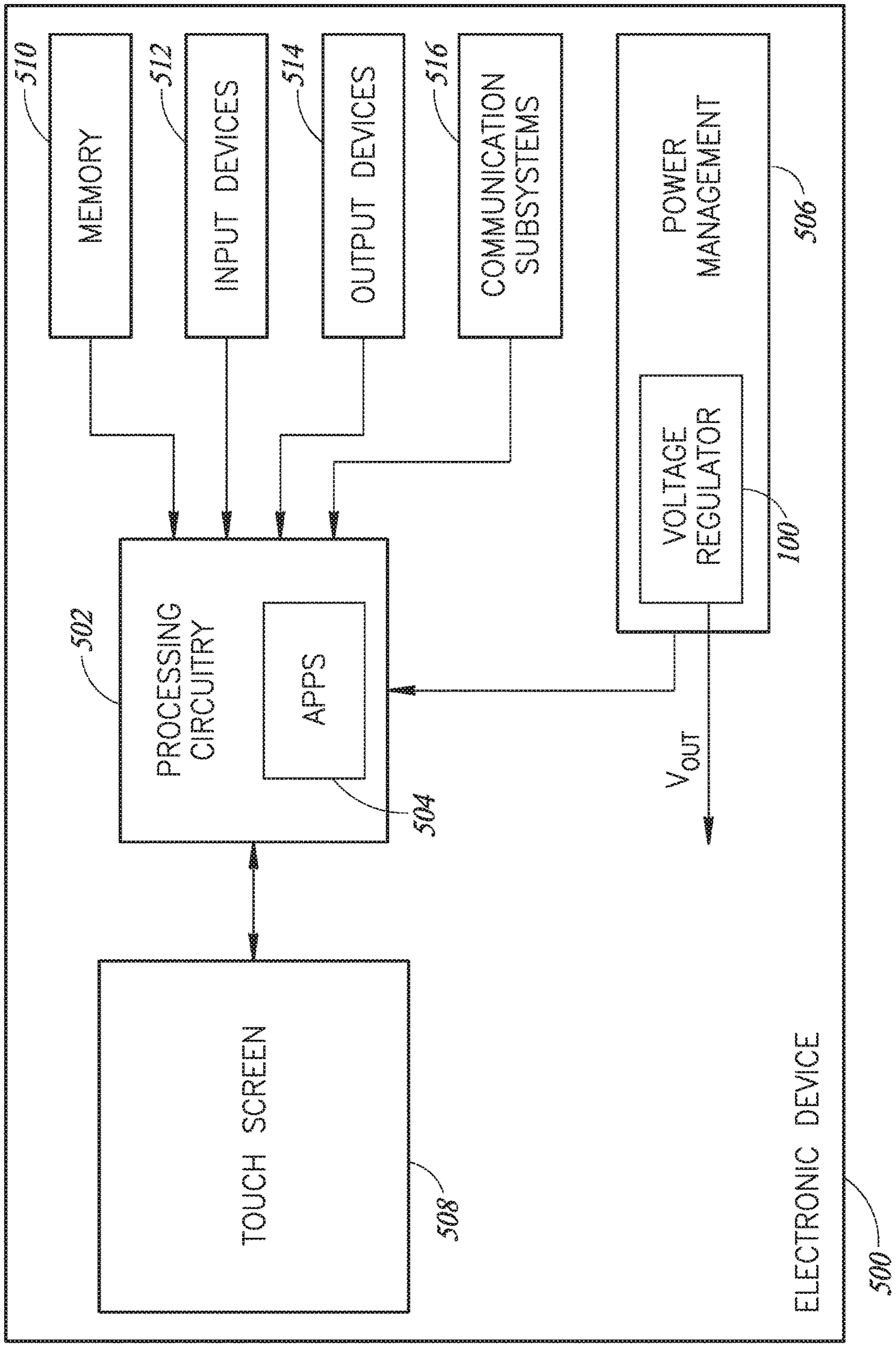
FIG. 5 is a functional block diagram of an electronic device including the voltage regulator of FIG. 1 or 2 according to one embodiment of the present disclosure.

FIG. 5 is a functional block diagram of an electronic device 500 including the voltage regulator 100 of FIG. 1 or 2 according to one embodiment of the present disclosure. The electronic device 500 in the example embodiment of FIG. 5 includes processing circuitry 502 that controls the overall operation of the electronic device 500 and also executes applications or "apps" 504 that provide specific functionality for a user of the electronic device. The voltage regulator 100 is shown as being contained in a power management subsystem 506 of the electronic device 500 and provides the generated output voltage VOUT to other components in the electronic device. The electronic device 500 may be any type of electronic device, such as a smart phone, tablet computer, laptop computer, desktop computer, other types of portable electronic devices like music players, wearable electronic devices like a heart rate or activity monitors, and so on.

The power management subsystem 506 of the electronic device 500 is coupled to the processing circuitry 502 and may include a battery for powering the electronic device 500 and also control circuitry for controlling power-related operating modes of the device such as charging of the battery, power-savings modes, and so on. The electronic device 500 further includes a video component such as a touch screen 508 with a touch display (not shown) like a liquid crystal display (LCD) and a touch panel (not shown) attached to or formed as an integral part of the touch display. In operation, the touch screen 508 senses touches of a user of the electronic device 500 and provides sensed touch information to the processing circuitry 502 to thereby allow the user to interface with and control the operation of the electronic device. The processing circuitry 502 also controls the touch screen 508 to display desired visual content on the touch display portion of the touch screen.

The electronic device 500 further includes data storage or memory 510 coupled to the processing circuitry 502 for storing and retrieving data including the apps 504 and other software executing on the processing circuitry and utilized by the electronic device 500 during operation. Examples of typical types of memory 510 include solid state memory such as DRAM, SRAM and FLASH, solid state drives (SSDs), and may include any other type of memory suited to the desired functionality of the electronic device 500 including digital video disks (DVDs), compact disk read-only (CD-ROMs), compact disk read-write (CD-RW) memories, magnetic tape, hard and floppy magnetic disks, tape cassettes, and so on.

Input devices 512 are coupled to the processing circuitry 502 and may include a keypad, whether implemented through the touch screen 508 or separately, a pressure sensor, accelerometer, microphone, keyboard, mouse, digital camera to capture still and video images, and other suitable input devices. Output devices 514 are coupled to the processing circuitry 502 and may include, for example, audio output devices such as a speaker, printer, vibration device, and so on. The input devices 512 and output devices 514 collectively may include other types of typical communications ports for the electronic device 500, such as USB ports, HDMI ports, and so on. The electronic device 500 further includes communications subsystems 516 coupled to the processing circuitry 502 and which may include Wi-Fi, GPS, cellular and Bluetooth subsystems for providing the device with the corresponding functionality. The specific type and number of input devices 512, output devices 514, communications subsystems 516, and even the specific functionality of the power management subsystem 506 will of course depend on the type of the electronic device 500

The various embodiments described above can be combined to provide further embodiments. Any U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the above-described embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a voltage regulator to improve the supply voltage rejection of the voltage regulator, the method comprising cancelling a noise signal generated on a reference voltage node of the voltage regulator due to a parasitic capacitive coupling of a noise signal present on a supply voltage node of the regulator to the reference voltage node, the noise signal on the reference voltage node being cancelled by inverting and applying a gain to the noise signal on the supply voltage node to generate a noise cancellation signal and providing the noise cancellation on the reference voltage node, wherein inverting and applying the gain to the noise signal on the supply voltage node to generate the noise cancellation signal includes modulating a threshold voltage of a MOS transistor responsive to the noise signal on the supply voltage node.

2. The method of claim 1, wherein modulating the threshold voltage of the MOS transistor responsive to the noise signal on the supply voltage node comprises applying the noise signal on the supply voltage node to the body of the MOS transistor.

3. The method of claim 2, wherein providing the noise cancellation signal on the reference voltage node comprises capacitively coupling the noise cancellation signal to the reference voltage node through a compensation capacitance.

4. The method of claim 3, wherein capacitively coupling the noise cancellation signal to the reference voltage node through the compensation capacitance comprises coupling the compensation capacitance between the high-impedance voltage reference node and a gate of the MOS transistor.

5. The method of claim 4 further comprising selecting a value of the compensation capacitance that is equal to the value of the parasitic capacitive coupling divided by the gain.

6. The method of claim 5 further comprising filtering the noise signal on the reference voltage node.

7. A voltage regulator comprising a noise compensation circuit coupled between a supply voltage node and a high-impedance node of the voltage regulator, the noise compensation circuit configured to generate a noise cancellation signal responsive to a noise signal present on the supply voltage node and to provide the noise cancellation signal on the high-impedance node to cancel a noise signal generated on a high-impedance node due to a parasitic capacitive coupling between the high-impedance node and the supply voltage node, wherein the noise compensation circuit includes an inverting buffer having an input coupled to the supply voltage node and an output coupled through a compensation capacitance to the high-impedance node, the compensation capacitance having a value that is approximately equal to the value of a parasitic capacitance that provides the parasitic capacitive coupling between the high-impedance node and the supply voltage node divided by a gain of the inverting buffer.

8. The voltage regulator of claim 7 further comprising:

a voltage reference circuit having an output; and a filter coupled between the output of the voltage reference circuit and the high-impedance node of the voltage regulator.

9. The voltage regulator of claim 7, wherein the inverting buffer further comprises a diode-coupled MOS transistor coupled in series with a current source between the output of the voltage reference circuit and a reference node, wherein a gate of the diode-coupled MOS transistor is coupled through the compensation capacitance to the high-impedance node and a body of the MOS transistor is coupled to the supply voltage node.

10. The voltage regulator of claim 8, wherein the diode-coupled MOS transistor comprises a PMOS transistor having a source node coupled to the output of the voltage reference circuit, and a drain coupled to the gate and to the current source.

11. The voltage regulator of claim 10 further comprising an output circuit coupled to the high-impedance node and configured to generate an output voltage responsive to a reference voltage on the high-impedance node.

12. The voltage regulator of claim 11, wherein the filter comprises and RC filter.

13. An electronic device, comprising:

processing circuitry;

a video display coupled to the processing circuitry; and power management circuitry including a voltage regulator, the voltage regulator including, a noise compensation circuit coupled between a supply voltage node and a high-impedance node of the voltage regulator, the noise compensation circuit configured to generate a noise cancellation signal responsive to a noise signal present on the supply voltage node and to provide the noise cancellation signal on the high-impedance node to cancel a noise signal generated on a high-impedance node due to a parasitic capacitive coupling between the high-impedance node and the supply voltage node, wherein the noise compensation circuit includes an inverting buffer having an input coupled to the supply voltage node and an output coupled through a compensation capacitance to the high-impedance node, the compensation capacitance having a value that is approximately equal to the value of a parasitic capacitance that provides the parasitic capacitive coupling between the high-impedance node and the supply voltage node divided by a gain of the inverting buffer;

a voltage reference circuit having an output;

a filter coupled between the output of the voltage reference circuit and the high-impedance node of the voltage regulator; and an output circuit coupled to the high-impedance node and configured to generate an output voltage responsive to a reference voltage on the high-impedance node.

14. The electronic device of claim 13, wherein the processing circuitry comprises one of smart phone, tablet computer, laptop computer, desktop computer, and wearable electronic device circuitry.

15. The electronic device of claim 14 further comprising memory coupled to the processing circuitry, input and output devices coupled to the processing circuitry, and communications subsystems coupled to the processing circuitry.

* * * * *